United States Patent Office 3,075,431
Patented Jan. 29, 1963

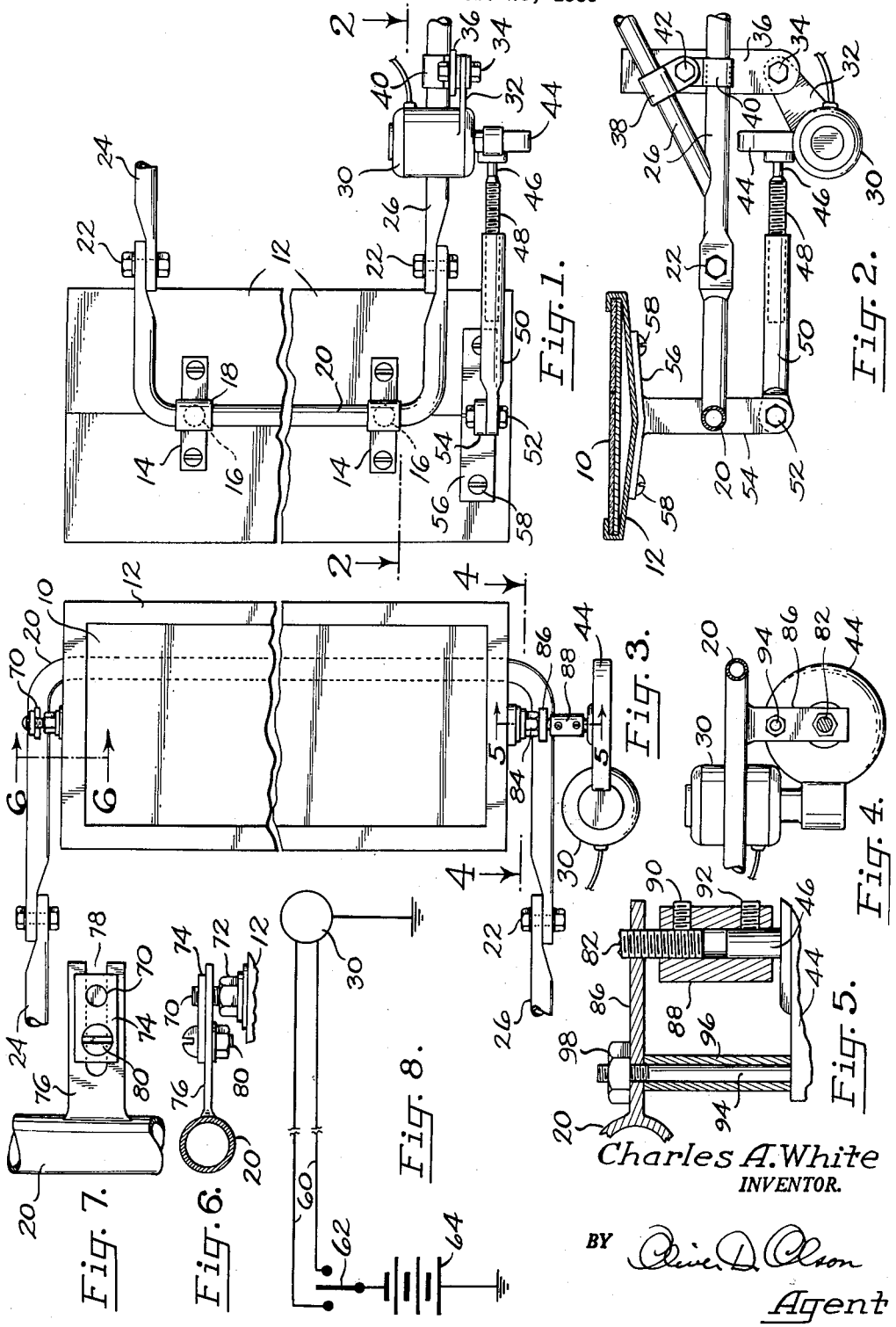

3,075,431
REAR VIEW MIRROR FOR TRUCKS
Charles A. White, 637 E. Main St., Ashland, Oreg.
Filed Feb. 26, 1959, Ser. No. 795,771
3 Claims. (Cl. 88—93)

This invention pertains to adjustable rear view mirrors, and relates particularly to a motor driven adjustable rear view mirror for trucks.

It is a principal object of the present invention to provide a motor driven adjustable rear view mirror for trucks, wherein the adjustment of the mirror is accomplished conveniently and simply by a control located within the truck cab within convenient reach of the truck operator.

Another important object of this invention is the provision of a motor driven adjustable rear view mirror for trucks, in which the motor drive assembly is adapted for attachment to any standard, commercially available side view mirror.

A further important object of the present invention is to provide a motor drive assembly which is adaptable for attachment to standard, commercially available side view truck mirrors with speed and facility, to provide adjustment control from the remote position of the interior of the truck cab.

Still another important object of this invention is the provision of a motor driven adjustable rear view mirror for trucks, which mirror assembly is of simplified constuction for economical manufacture, which is rugged and stable in operation and requires a minimum of maintenance and repair.

The foregoing and other objects and advantages of this invention will appear from the following detailed description, taken in connection with the accompanying drawing in which:

FIG. 1 is a foreshortened fragmentary view in side elevation of a conventional type truck side view mirror having attached thereto a motor drive assembly embodying features of the present invention;

FIG. 2 is a sectional view taken along the line 2—2 in FIG. 1;

FIG. 3 is a foreshortened fragmentary view in side elevation of another form of commercially available truck side view mirror having attached thereto a modified form of motor drive assembly embodying features of this invention;

FIG. 4 is a fragmentary sectional view taken along the line 4—4 in FIG. 3;

FIG. 5 is a fragmentary sectional view taken along the line 5—5 in FIG. 3;

FIG. 6 is a fragmentary sectional view taken along the line 6—6 in FIG. 3;

FIG. 7 is a fragmentary view in side elevation as viewed from the top in FIG. 6; and FIG. 8 is a schematic diagram of an electric control circuit for either of the electric motors of the embodiments of FIGS. 1 and 3.

Referring first to the embodiment illustrated in FIGS. 1 and 2, there is shown a conventional truck side view mirror 10 mounted in a housing 12. Mounted upon the back of the housing in vertically spaced relation are a pair of brackets 14 which support the rearwardly projecting male ball sections of a ball and socket connection 16. The companion female section of each connection projects from a clamp 18, which is mounted upon the closed end of the U-shaped section 20 of the mirror support bracket. The vertically spaced terminal ends of this bracket section are connected pivotally, through the bolts 22, to one end of the bracket arms 24, 26. The opposite end of these arms is adapted for mounting upon the vehicle body, in manner well known in the art.

Ordinarily the bracket arms are mounted on the truck cab to position the mirror for rearward viewing by the truck operator from his position within the cab. Suitable manual adjustments of the mirror may be made at the pivot connections of the bolts 22 and at the ball and socket connections 16.

In accordance with the present invention, means is provided for driving the mirror through its range of adjustment, from the remote position of the operator within the truck cab. This is accomplished by the provision of a motor drive assembly, preferably of such construction as to be readily attached to a conventional side view mirror with a minimum of alteration to the latter.

In the embodiment illustrated in FIGS. 1 and 2, the motor drive assembly includes an electric reversible motor 30 provided with a projecting arm 32 which is connected pivotally through a securing bolt 34 to a bracket 36. The bracket carries a pair of clamp members 38, 40 releasably and pivotally secured thereto by the bolt 42, the bracket and clamp members functioning to secure therebetween the diverging mirror bracket arms 26. In this manner the motor is supported by the mirror support.

The output driven shaft of the electric motor 30 is connected to a gear reducer 44, preferably formed as an integral part of the motor. The output shaft 46 of the gear reducer is provided with an elongated threaded section 48 which is received within the threaded bore of an elongated tube 50. The opposite end of the tube is connected pivotally, by means of the bolt 52, to the projecting end of the arm 54 which extends from a plate 56 secured to the back of the mirror housing 12 by the sheet metal screws 58.

The foregoing arrangement of the motor drive assembly permits manual adjustment of the mirror at the pivot connections 22 of the mirror support bracket sections. Adjustment of the mirror at the ball and socket supports 16 is achieved by proper manipulation of the telescoping threaded shaft section 48 and tube 50, by appropriate operation of the electric motor 30.

The electric motor 30 is connected through wires 60 to separate terminals of an electric reversing switch 62, the operating contact of which is connected to a terminal of the truck battery 64, as illustrated in FIG. 8. The switch preferably is mounted upon the dash panel of the truck within convenient reach of the operator, and functions as a control for operating the electric motor in forward or reverse directions, to rotate the mirror to the desired position.

Referring now to FIGS. 3–7, the conventional truck mirror illustrated therein differs from the type illustrated in FIGS. 1 and 2 in the form of pivotal mounting of the mirror housing 12 upon the U-shaped bracket 20. A stub shaft 70 is secured in the upper end wall of the mirror housing 12, as by the nut 72, and projects upwardly therefrom through a circular opening in the adjustable bearing plate 74. This plate is secured adjustably to a bracket 76 projecting from the upper arm of the U-shaped bracket 20 (FIG. 7), the latter being provided with an elongated slot 78 through which to receive the securing bolt 80. In this manner the bearing plate may be adjusted longitudinally with respect to the projecting bracket 76, for tilting the mirror with respect to the plane of the bracket 20.

A second stub shaft 82 is secured in the lower end wall of the mirror housing 12, as by nut 84, and projects downwardly therefrom and coaxial with the upper stub shaft 70. The projecting end of the lower shaft 82 extends through a circular opening in the bracket 86 extending from the lower arm of the U-shaped bracket 20 and is connected to the output shaft 46 of the gear reducer 44 by means of the connecting sleeve 88. As best shown in FIG. 5, one end of the sleeve is received onto the threaded end of the stub shaft 82 and secured thereto by means of the set screw 90. The opposite end of the sleeve receives the projecting end of the gear reducer output shaft 44 and is secured thereto by means of the set screw 92.

The gear reducer 44 and electric motor 30 formed integrally therewith are supported upon the projecting bracket 86 by the arrangement best shown in FIG. 5. A bolt 94 is secured at one end to the housing of the gear reducer 44 and projects upwardly therefrom a spaced distance from and parallel to the axis of the sleeve-connected shafts 46, 82. A spacer sleeve 96 is mounted upon the bolt 94 between the gear reducer housing and the bracket. The upper end of the bolt extends through an opening in the bracket and receives a securing nut 98 by which to secure the gear reducer firmly to the bracket.

As in the embodiment illustrated in FIGS. 1 and 2, the motor drive assembly associated with the mirror shown in FIG. 3 also permits manual adjustment of the mirror bracket sections at the pivot bolts 22. Rotation of the mirror on the axis of the stub shafts 70, 82 is effected by the electric motor 30 which is controlled in either direction of rotation by the control switch arrangement illustrated in FIG. 8 and described hereinbefore.

It is to be noted that in both of the embodiments illustrated, the motor drive assemblies are readily adapted for attachment to standard types of truck mirrors such as those illustrated, with a minimum of modification of the latter. Thus, in the embodiment of FIGS. 1 and 2, the only required modification of the mirror assembly involves the provision of a pair of openings in the back of the mirror housing 12 for registration with the openings in the plate 56 to receive the sheet metal screws 58. In the embodiment of FIG. 3, the only required modification of the standard mirror assembly is the provision of a second opening in the lower bracket 86 to receive the mounting bolt 94. The necessity for these openings may be eliminated by appropriately designed clamping brackets, as will be apparent. Thus, the motor drive assembly may be incorporated with especially designed or standard mirrors, for new installations, or they may be added to standard truck mirrors already in use. In either case, the present invention provides simplified and economical means by which to control the adjustment of side view mirrors precisely and with facility from the remote position of the truck operator within the cab.

It will be apparent to those skilled in the art that various changes may be made in the types and arrangements of parts and other details of construction described hereinbefore. For example, a drive motor of the hydraulic, air, or other suitable type may replace electric motor 30, with corresponding substitution of a valve for control switch 62. This and other changes may be made without departing from the spirit of this invention and the scope of the appended claims.

Having now described my invention and the manner in which the same may be used, what I claim as new and desire to secure by Letters Patent is:

1. A side view mirror assembly for vehicles comprising a mirror, a mirror bracket including an elongated mounting bracket adapted to be fixed at one end to a vehicle, a mirror support, first pivot means connecting the support to the projecting end of the mounting bracket for rotational hand adjustment of the mirror on a substantially vertical axis, second pivot means parallel to the first pivot means mounting the mirror on the support and forming a second rotational adjustment for the mirror on a substantially vertical axis, independent of the first pivot means, a reversible power motor detachably mounted on the mirror bracket and having an output drive shaft, coupling means releasably connecting the output drive shaft operatively to the mirror for rotating the latter on said second pivot means upon actuation of said power motor, flexible connector means connecting the power motor to a source of power in the vehicle, and control means associated with the connector means for operating the power motor, the control means being adapted to be positioned within the vehicle remote from the mirror.

2. A side view mirror assembly for vehicles comprising a mirror, a mirror bracket including an elongated mounting bracket adapted to be fixed at one end to a vehicle, a mirror support, first pivot means connecting the support to the projecting end of the mounting bracket for rotational hand adjustment of the mirror on a substantially vertical axis, second pivot means parallel to the first pivot means mounting the mirror, and means pivotally attaching the mirror to the support and forming a second rotational adjustment for the mirror on a substantially vertical axis independent of the first pivot means, a motor bracket secured to said mounting bracket, a reversible power motor having an output drive shaft, pivot means pivotally mounting said power motor on said motor bracket, longitudinally extensible coupling means spanning the first pivot means and connected to the output drive shaft and at the opposite end pivotally to the mirror for rotating the latter on said second pivot means upon actuation of said power motor, flexible connector means connecting the power motor to a source of power in the vehicle, and control means associated with the connector means for operating the power motor, the control means being adapted to be positioned within the vehicle remote from the mirror.

3. A side view mirror assembly for vehicles comprising a mirror, a mirror bracket including an elongated mounting bracket adapted to be fixed at one end to a vehicle, a mirror support, first pivot means connecting the support to the projecting end of the mounting bracket for rotational hand adjustment of the mirror on a substantially vertical axis, shaft means parallel to the first pivot means and pivotally attaching the mirror to the mirror support and forming a second rotational adjustment for the mirror on a substantially vertical axis, a reversible power motor having an output drive shaft, attaching means mounting the motor drive on the mirror support with the output shaft disposed in coaxial spaced relation with the mirror shaft means, coupling means releasably interconnecting the output shaft and the mirror shaft means, flexible connector means connecting the power motor to a source of power in the vehicle, and control means associated with the connector means for operating the power motor, the control means being adapted to be positioned within the vehicle remote from the mirror.

References Cited in the file of this patent

UNITED STATES PATENTS

| | | |
|---|---|---|
| 2,626,539 | Peterson | Jan. 27, 1953 |
| 2,713,810 | Hill | July 26, 1955 |
| 2,751,817 | Lapekas | June 26, 1956 |
| 2,783,015 | Kampa | Feb. 26, 1957 |
| 2,803,733 | Kashirsky | Aug. 20, 1957 |
| 2,807,985 | Beach | Oct. 1, 1957 |
| 2,843,018 | Cooper et al. | July 15, 1958 |
| 2,871,761 | Snyder | Feb. 3, 1959 |
| 2,873,647 | Bach | Feb. 17, 1959 |
| 2,877,686 | Foster | Mar. 17, 1959 |